United States Patent [19]

Martinez

[11] Patent Number: 4,984,267
[45] Date of Patent: Jan. 8, 1991

[54] BACKUP POWER SUPPLY AT SUBSCRIBER TERMINAL

[75] Inventor: Edgar Martinez, White Plains, N.Y.

[73] Assignee: Nynex Corporation, New York, N.Y.

[21] Appl. No.: 471,378

[22] Filed: Jan. 29, 1990

[51] Int. Cl.[5] .......................................... H04M 19/08
[52] U.S. Cl. ..................................... 379/413; 379/324
[58] Field of Search ..................... 379/324, 387, 413

[56] References Cited

U.S. PATENT DOCUMENTS

| | | | |
|---|---|---|---|
| 4,532,382 | 7/1985 | Pommer | 379/413 X |
| 4,547,629 | 10/1985 | Corless | 379/413 X |
| 4,560,841 | 12/1985 | Pierrel | 379/413 |
| 4,634,814 | 1/1987 | Pommer | 379/377 |
| 4,825,349 | 4/1989 | Marcel | 379/413 X |
| 4,847,899 | 7/1989 | Hikida | 379/413 |

Primary Examiner—James L. Dwyer
Assistant Examiner—M. Shehata
Attorney, Agent, or Firm—Douglas Kirk; John J. Torrente

[57] ABSTRACT

An interconnecting apparatus for a subscriber premises which allows the DC battery providing sealing current to the tip and ring telephone lines serving the premises to be used as a backup battery for a subscriber terminal and which allows the supply serving the subscriber terminal to be used to charge the central office battery and provide sealing current when the latter battery is low.

13 Claims, 1 Drawing Sheet

BACKUP POWER SUPPLY AT SUBSCRIBER TERMINAL

BACKGROUND OF THE INVENTION

This invention relates to subscriber terminals used with telephone lines and, in particular, to subscriber terminals requiring power to operate and to telephone lines requiring a continuous current for sealing the lines.

The newest types of subscriber telephone terminals, such as those containing microprocessors, require external power to function. Presently, these terminals obtain power via connection to the customer's standard electrical service. If for some reason this service is lost, the subscriber terminals cease to operate. Such loss of communication capability is particularly onerous in systems providing emergency phone service. Furthermore, in business related applications, the economic loss for lapses in communication capability can be substantial.

In systems of the described type, the subscriber terminals are served by tip and ring telephone lines which are brought to the subscriber's premises from the telephone central office. These lines must be kept free of corrosion. This is presently accomplished by a battery located at the central office.

Since the central office battery is continuously supplying sealing current, there is a likelihood that the battery may become drained. As a result, additional equipment must be provided at the central office for charging the battery. This adds to the cost and complexity of the central office which is undesirable.

It is an object of the present invention to provide an apparatus and method for supplying backup power for a subscriber terminal during power outages at the subscriber's location.

It is a further object of the present invention to provide an apparatus and method by which a continuous current can be generated for charging the central office battery without additional charging equipment at the central office.

It is still a further object of the present invention to provide an apparatus and method by which a required continuous sealing current can be provided on the tip and ring lines connected to a subscriber's premises even when the central office battery is low or drained.

SUMMARY OF THE INVENTION

In accordance with the principles of the present invention, the above and other objectives are realized in an apparatus and method which enable the central office battery providing sealing current to the tip and ring lines serving a subscriber premises to be used as a backup for the power source providing DC power to a subscriber terminal and which further enable the aforesaid power source to be used to charge the central office battery and provide sealing current to the tip and ring lines when the central office battery is low or discharged. In particular, the apparatus includes first, second and third sets of terminals adapted to be connected to the tip and ring lines, the DC power source and the subscriber terminal, respectively, and means interconnecting these sets of terminals such that DC signals at the first and second sets of terminals are permitted to be coupled to the second and first sets of terminals, respectively, and are inhibited from being coupled to the third set of terminals and AC signals at the first and third sets of terminals are permitted to be coupled to the third and first sets of terminals, respectively, and are inhibited from being coupled to the second set of terminals. In the embodiment of the invention to be described hereinafter, first terminals of each of the sets of terminals are directly connected to each other. The second terminal of the first set is, in turn, connected to the second terminal of the third set via a DC blocking capacitor and to the second terminal of the second set via an AC blocking inductor.

BRIEF DESCRIPTION OF THE DRAWING

The above and other features and aspects of the present invention will become more apparent upon reading the following detailed description in conjunction with the accompanying drawing in which.

DETAILED DESCRIPTION

Figure 1:
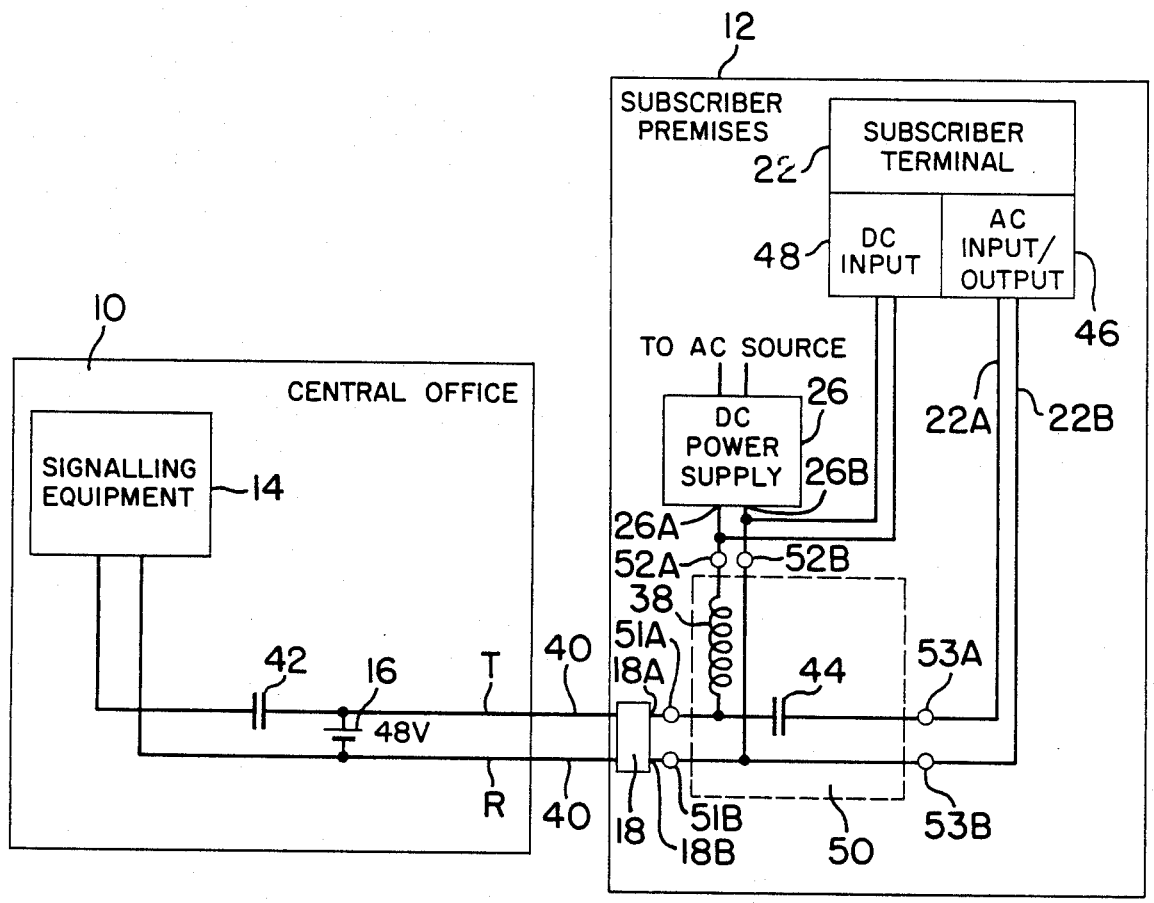
FIG. 1, shows an apparatus in accordance with the principles of the present invention.

In FIG. 1, a central office 10 is connected to a subscriber premises 12 by tip and ring, i.e., T and R, telephone lines 40. Within the central office 10, signalling equipment 14, shown as equipment for an integrated services digital network (ISDN), provides AC signals to the T and R lines 40 through a DC blocking capacitor 42. The central office 10 includes further equipment for providing a predetermined DC voltage and whose output is coupled across the T and R lines 40. In FIG. 1, this further equipment is shown as a 48 v central office battery 16. The battery 16 generates a current which passes through the T and R lines 40 between the battery 16 and the subscriber premises 12. This current acts as a sealing current, thereby preventing the buildup of corrosion on the lines.

The T and R lines 40 are made available at the subscriber premises 12 via terminals 18A and 18B of a phone jack 18. The latter terminals 18A, 18B of jack 18 are, in turn, connected to a DC power supply 26 and to a subscriber terminal 22 via an interconnecting circuit or block 50 having first, second and third sets of terminals 51A, 51B, 52A, 52B and 53A, 53B. As shown, the terminals 51A, 51B of the circuit 50 connect to the T and R lines 40 through the jack terminals 18A, 18B. The terminals 53A, 53B connect to output lines 22A, 22B, respectively, from an AC signal I/O block 46 of the terminal 22. The terminals 52A, 52B, in turn, connect to output lines 26A, 26B of the supply 26.

The supply 26 is itself powered by the AC source serving the subscriber premises. It, in turn, provides DC power to the subscriber terminal 22 via its output lines 26A, 26B which are connected to the subscriber terminal, input block 48. The terminal 22 is shown as an ISDN microprocessor driven telephone handset. Such a handset operates on 48 v DC power and thus the supply 26 is also shown as a 48 v DC source.

In accordance with the invention, the interconnecting circuit 50 permits DC signals to be coupled between its sets of terminals 51A, 51B and 52A, 52B, while inhibiting the coupling of DC signals between its sets of terminals 51A, 51B and 53A, 53B and its sets of terminals 52A, 52B and 53A, 53B. Furthermore, the circuit 50 is also adapted to permit AC signals to be coupled between its sets of terminals 51A, 51B, and 53A, 53B, while inhibiting the coupling of AC signals between its sets of terminals 51A, 51B and 52A, 52B, and its sets of terminals 53A, 53B and 52A, 52B. In the present illustrative case, this is realized in the circuit 50 by connecting the terminals 51B, 52B and 53B in common and by connecting the terminal 51A to the terminal 53A via a DC blocking capacitor 44, the terminal 51A to the terminal 52A via an AC blocking inductor 38 and the terminal 52A to the terminal 53A via both the DC blocking capacitor 14 and AC blocking inductor 38.

With the circuit 50 configured as aforesaid, the supply 26, in addition to supplying power to the subscriber terminal 22, also provides a charging current to the central office battery 16 when the battery voltage becomes drained below its 48 v output. This DC charging current also serves at this time as the sealing current for the T and R lines 40. Furthermore, the current is blocked from the terminal 14 and subscriber terminal 22 by the capacitors 42 and 44, respectively.

On the other hand, when the power supply 26 fails, either due to the power supply itself failing or to the AC supply at the subscriber premises failing, the subscriber terminal 22 will not loose power, since it will now receive power from the central office battery 16. This is brought about through the T and R lines 40, the jack 18 and the inductor 38 of the connector 50.

Use of the interconnection block 50 thus permits charging of the central office battery 16 and the supplying of sealing current to the T and R lines 40, while also permitting backup power to be supplied to the terminal 22 at the subscriber premises. This is achieved without any additional charging equipment at the central office or additional battery equipment at the subscriber premises. An overall economical and efficient system in thus achieved.

In all cases it is understood that the above-described arrangements are merely illustrative of the many possible specific embodiments which represent applications of the present invention. Numerous and varied other arrangements can readily be devised in accordance with the principles of the present invention without departing form the spirit and scope of the invention. Thus, for example, in the embodiment of the apparatus in FIG. 1, a network of circuitry might replace the inductor 38 the capacitor 44 to perform the AC and DC blocking functions. Also, while the invention has been illustrated in connection with a central office 10, it can also be used with a PBX or the like.

What is claimed is:

1. Apparatus for use with a telephone subscriber premises, the premises being adapted to be connected to tip and ring telephone lines and including a subscriber terminal connected via signal lines to said tip and ring lines and a supply for supplying DC power over supply lines to the subscriber terminal, the apparatus comprising:
   a first set of terminals adapted to be connected to the tip and ring lines;
   a second set of terminals adapted to be connected to the supply lines;
   a third set of terminals adapted to be connected to the signal lines;
   and means interconnecting said first, second and third sets of terminals such that DC signals at the first and second sets of terminals are permitted to be coupled to the second and first sets of terminals, respectively, and inhibited from being coupled to the third set of terminals and such that AC signals at the first and third sets of terminals are permitted to be coupled to third and first sets of terminals, respectively, and inhibited from being coupled to the second set of terminals.

2. Apparatus in accordance with claim 1 wherein: said interconnecting means comprises: inductive means connected between a first terminal of said first set of terminals and a first terminal of said second set of terminals; and capacitive means connected between said first terminal of said first set of terminals and a first terminal of said third set of terminals;
   and second terminals of said first, second and third sets of terminals are connected together.

3. Apparatus in accordance with claim 1 further comprising:
   a telephone jack adapted to be connected between said first set of terminals and said tip and ring lines.

4. In combination:
   a subscriber terminal including signal lines for connecting said subscriber terminal to tip and ring telephone lines;
   a supply for supplying DC power to the subscriber terminal over supply lines;
   and apparatus for interconnecting said subscriber terminal, tip and ring lines and said supply comprising: a first set of terminals adapted to be connected to the tip and ring lines; a second set of terminals connected to the supply lines; a third set of terminals connected to said signal lines; and means interconnecting said first, second and third sets of terminals such that DC signals at the first and second sets of terminals are permitted to be coupled to the second and first sets of terminals, respectively, and inhibited from being coupled to the third set of terminals and such that AC signals at the first and third sets of terminals are permitted to be coupled to third and first sets of terminals, respectively, and inhibited from being coupled to the second set of terminals.

5. The combination of claim 4 wherein:
said subscriber terminal is a digital telephone terminal;
and said supply supplies 48 v DC to said digital telephone terminal.

6. The combination of claim 4 wherein:
said interconnecting means comprises: inductive means connected between a first terminal of said first set of terminals and a first terminal of said second set of terminals; and capacitive means connected between said first terminal of said first set of terminals and a first terminal of said third set of terminals;
and second terminals of said first, second and third sets of terminals are connected together.

7. The combination of claim 4 further comprising:
a subscriber premises housing said subscriber terminal, supply and interconnecting apparatus;
a telephone central office including a central office battery;
tip and ring telephone lines connected between said central office and said subscriber premises:
said central office battery being connected to said tip and ring lines.

8. The combination of claim 7 wherein:
said supply supplies a predetermined DC voltage to said subscriber terminal;
and said central office battery is at said predetermined voltage.

9. The combination of claim 8 wherein:
said predetermined voltage is 48 v.

10. The combination of claim 8 wherein:

said subscriber terminal is a digital telephone terminal.

11. The combination of claim 10 wherein:
said predetermined voltage is 48 v.

12. The combination of claim 7 wherein:
said interconnecting means comprises: inductive means connected between a first terminal of said first set of terminals and a first terminal of said second set of terminals; and capacitive means connected between said first terminal of said first set of terminals and a first terminal of said third set of terminals;
and second terminals of said first, second and third sets of terminals are connected together.

13. Apparatus in accordance with claim 7 wherein:
said supply provides charging current, through said tip and ring lines, to said central office battery, when said central office battery voltage is less than said supply voltage.

* * * * *